United States Patent [19]

Lech

[11] Patent Number: 4,942,935
[45] Date of Patent: Jul. 24, 1990

[54] AUXILIARY POWER STEERING SYSTEM
[75] Inventor: Richard J. Lech, Lockport, Ill.
[73] Assignee: J. I. Case Company, Racine, Wis.
[21] Appl. No.: 380,000
[22] Filed: Jul. 14, 1989
[51] Int. Cl.$^5$ .......................... B62D 5/30; B62D 5/06
[52] U.S. Cl. .................................. 180/133; 180/132; 60/403; 60/384
[58] Field of Search ........................ 180/133, 132, 141; 60/403, 384

[56] References Cited

U.S. PATENT DOCUMENTS

| | | | |
|---|---|---|---|
| 3,001,540 | 9/1961 | Hooks et al. | 137/112 |
| 3,083,533 | 4/1963 | Schenkelberger | 60/51 |
| 3,590,689 | 7/1971 | Brewer et al. | 91/412 |
| 3,631,937 | 6/1972 | Joyce | 180/79.2 B |
| 3,730,288 | 5/1973 | Dean | 180/79.2 R |
| 3,747,725 | 7/1973 | Feustel et al. | 180/79.2 R |
| 3,762,492 | 10/1973 | Ron | 180/79.2 R |
| 3,820,620 | 6/1974 | Miller et al. | 180/79.2 B |
| 3,847,243 | 11/1974 | Barth | 180/79.2 R |
| 3,921,748 | 11/1975 | Dunn | 180/79.2 R |
| 4,422,290 | 12/1983 | Huffman | 60/404 |
| 4,618,017 | 10/1986 | Liebert et al. | 180/133 |
| 4,651,841 | 3/1987 | Adams | 180/142 |
| 4,736,811 | 4/1988 | Marsden et al. | 180/133 |
| 4,765,427 | 8/1988 | Yonker | 180/143 |
| 4,798,256 | 1/1989 | Fassbener | 180/133 |

Primary Examiner—Charles A. Marmor
Assistant Examiner—Mitchell Bompey
Attorney, Agent, or Firm—Peter N. Jansson, Ltd.

[57] ABSTRACT

In general, an auxiliary system for steering a vehicle includes a power steering unit coupled to the vehicle steering wheel so that the steering unit is thereby made capable of being manually powered by a vehicle operator for providing a supply of fluid at a first pressure. Valve means is connected between the steering unit and a pressure intensification device for selectively providing motive power to the device. Actuator means is connected between the device and the steering linkage of a vehicle for steering movement of the wheels. The intensification device is powered for rotation by the fluid at the first pressure when the steering unit is manually operated. The intensification device thereby delivers hydraulic fluid to the actuator means at a second pressure for steering the vehicle during auxiliary conditions.

14 Claims, 1 Drawing Sheet

AUXILIARY POWER STEERING SYSTEM

FIELD OF THE INVENTION

This invention is related generally to power steering systems and, more particularly, to an auxiliary steering system which derives its power from the vehicle operator and which is especially useful on large wheeled vehicles.

BACKGROUND OF THE INVENTION

Because of their size and weight, large, wheeled construction vehicles such as front end loaders, road graders, backhoes and the like require power steering for proper vehicle control. The manual steering effort which would otherwise be required is excessive for even relatively short periods of time, notwithstanding a high level of individual operator physical strength. In addition, an occasional failure of one or more components critical to the normal power steering function will disable the vehicle unless means are provided for backup auxiliary power steering. In fact, it is nearly impossible even to controllably tow such a vehicle unless auxiliary power steering is available.

One solution to this problem is to equip the vehicle with a redundant power steering pump or to cause an auxiliary pump to be diverted to power steering use in the event of failure of the main power steering pump. A disadvantage of this approach is that it relies upon the availability of the vehicle engine and an engine failure would therefore make this approach useless. In addition, provision for such an auxiliary system must be made at the factory during the time of vehicle construction since it will likely require the provision of an additional pump mounting location. Examples of systems of this type are shown in U.S. Pat. Nos. 3,730,288 and 3,747,725.

Other ways in which auxiliary power steering may be provided are shown in U.S. Pat. Nos. 3,083,533 and 4,422,290. Both systems use a hydraulic accumulator (a vessel using gas under pressure to pressurize a contained quantity of hydraulic fluid) to provide auxiliary power steering fluid in the event of failure of the normal fluid source. The apparatus described in the first mentioned patent charges the accumulator using an electric pump driven from the vehicle battery while that described in the second patent charges the accumulator using an onboard implement pump. Since accumulators contain only a relatively small quantity of fluid, systems which use them become unreliable or non-functional after only a few steering movements. Such systems likewise are most satisfactorily installed at the factory. Even if they are charged by an electrically powered pump, their reliability depends upon the electric storage battery which, even if well charged, will become depleted over time. Examples of systems which use electrically powered auxiliary steering pumps are shown in U.S. Pat. Nos. 3,921,748; 3,847,243 and 3,820,620, among others. Of course, these electrically powered systems suffer from many of the same deficiencies described above. In fact, such a system will be useless if it is a battery failure which has disabled the vehicle.

Another way in which auxiliary power steering has been provided on such vehicles is by using the substantial kinetic energy of the moving vehicle as the motive power for the steering pump. Examples are described in U.S. Pat. Nos. 4,618,017 and 3,631,937. Of course, the most significant disadvantage of a system of this type is that it is not available when the vehicle is motionless. To aggravate the disadvantage, a motionless vehicle will likely require a higher steering effort than one which is moving.

While the systems described above have been generally satisfactory, they have failed to provide solutions to certain types of unusual steering requirements. For example, certain steering systems, e.g., those equipped with electric auxiliary pumps, accumulators or engine powered auxiliary pumps, may provide substantially the same ease of steering effort as the normal steering system. Therefore, the operator may forget that the normal steering system is disabled and the need for immediate repair may be overlooked.

In addition, these earlier systems have failed to recognize the manner in which an auxiliary power steering system may be constructed to meet recent requirements being imposed by some countries upon the functional characteristics of such vehicles. Specifically, some countries are requiring owners and manufacturers of such large vehicles to design them to be able to steer a measured, serpentine course even though specified vehicle components may be disabled and even though the vehicle may be under tow. Further, these earlier designs are not readily adapted to be provided in kit form for field installation.

An auxiliary power steering system which resolves the disadvantages described above would be a distinct advance in the art.

OBJECTS OF THE INVENTION

It is an object of this invention to overcome some of the problems and shortcomings of the prior art.

Another object of the invention is to provide an auxiliary power steering system which uses operator effort as the motive power for vehicle steering.

Yet another object of the invention is to provide an auxiliary power steering system which is operative even though the vehicle engine and battery may be inoperative.

Still another object of the invention is to provide an auxiliary power steering system which is operative even when the vehicle is motionless.

Another object of the invention is to provide an auxiliary power steering system which may be included during construction of the vehicle or provided in kit form for convenient addition in the field.

Still another object of the invention is to provide an auxiliary power steering system for use over an indefinite duration.

These and other important objects will be apparent from the descriptions of this invention which follow.

SUMMARY OF THE INVENTION

In general, an auxiliary system for steering a vehicle includes a power steering unit coupled to the vehicle steering wheel so that the steering unit is thereby made capable of being manually powered by a vehicle operator for providing a supply of fluid at a first pressure. Valve means is connected between the steering unit and a pressure intensification device for selectively providing motive power to the device. Actuator means is connected between the device and the steering linkage of a vehicle for steering movement of the wheels. The intensification device is powered for rotation by the fluid at the first pressure when the steering unit is manually operated. The intensification device thereby delivers hydraulic fluid to the actuator means at a second pressure for steering the vehicle.

More particularly, the power steering unit may be of the open center or closed center type. A commonly used power steering unit uses a modified gear-in-gear design referred to as a gerotor pump. During normal steering, rotation of the steering wheel in one direction will cause the gerotor to direct hydraulic fluid along a first path for steering leftward or along a second path for steering rightward.

Valve means is used to direct fluid to the steering actuator during normal steering or to divert fluid to a pressure intensification device during auxiliary steering. The valve means is preferably embodied as a pair of pilot operated, spring biased 3-way valves. During normal steering, pilot pressure maintains the valves in a position to direct fluid from the steering unit to the steering actuator. Upon loss of pilot pressure, as may result from engine failure, the valves are urged by springs to a second position whereby fluid from the steering unit is diverted to a pressure intensification device.

The intensification device includes a low pressure section which receives hydraulic fluid from the power steering unit at a first, relatively low pressure and a relatively high volumetric flow rate. The magnitude of this first pressure is a function of several factors including the rate at which the vehicle operator is able to rotate the steering wheel in an auxiliary steering condition. When so powered by hydraulic fluid from the steering unit, the low pressure section of the intensifier device acts as a hydraulic motor to drive a high pressure section which is mechanically coupled thereto. When so driven, the high pressure section delivers fluid at a second, higher pressure and relatively low volumetric flow rate to the steering actuator, one or two hydraulic cylinders, for example. The actuator is coupled to the steering linkage to provide vehicle steering.

During auxiliary power steering, the system may be viewed as two mechanically coupled, hydraulic closed loop transmissions. The first transmission includes the power steering unit as the pump and the low pressure section of the intensifying device as a motor. The second transmission includes the high pressure section of the device as a pump and the steering actuator as the motor.

DETAILED DESCRIPTION OF THE DRAWINGS

Figure 2:
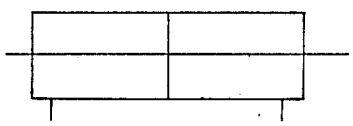
FIG. 2 is a symbolic diagram of a double acting cylinder useable in place of single acting cylinders with the vehicle power steering system shown in FIG. 1.
Figure 1:
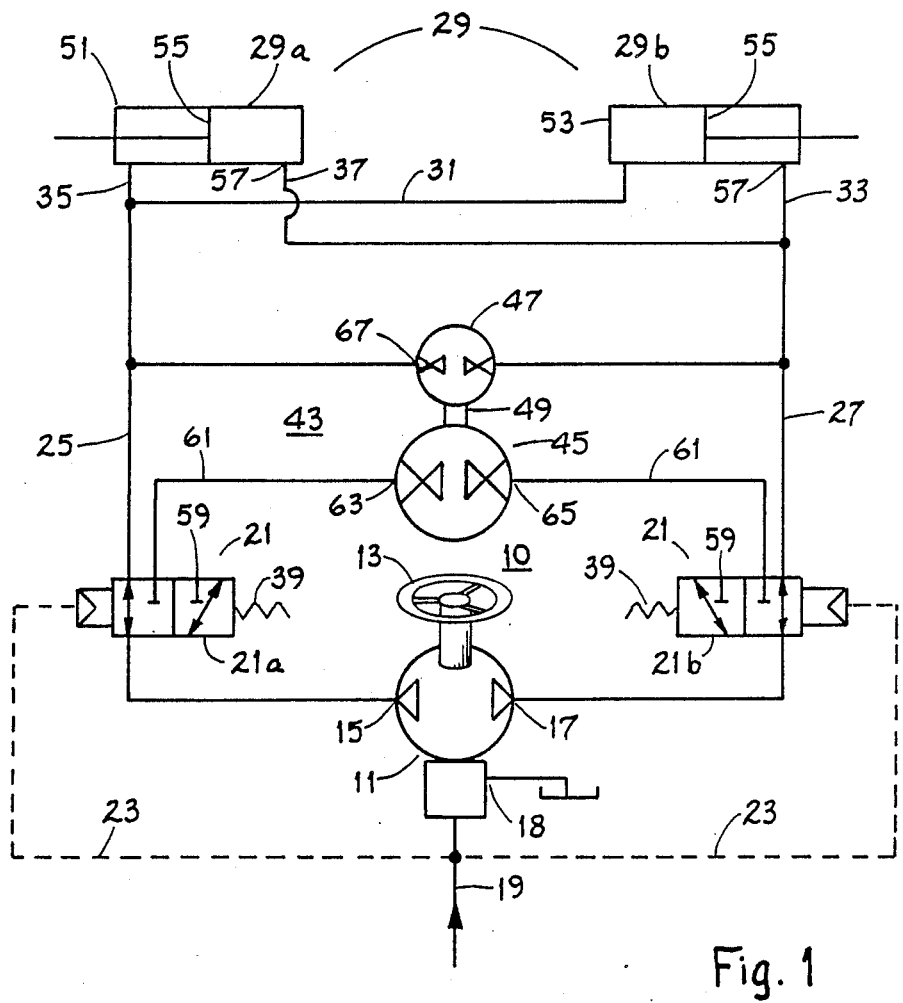
FIG. 1 is a hydraulic schematic diagram of a vehicle power steering system including the auxiliary power steering system, such vehicle power steering system being shown with two single acting steering cylinders.

Referring to FIG. 1, the auxiliary power steering system is shown to include a power steering unit 11 pictorially depicted to be coupled to a vehicle steering wheel 13. In a highly preferred embodiment, the unit 11 will include an internal gerotor element (not shown) which, when actuated by rotating the vehicle steering wheel 13, will deliver hydraulic fluid from a first port 15 or a second port 17, depending upon the direction of steering wheel rotation Such steering units are commonly configured to be used in steering systems of the open center or closed center type. A system of the open center type is symbolically shown to have a connection 18 to a hydraulic tank when no steering movement is occurring. In either type, the minimum pressure available at the fluid supply line 19 during normal steering is above the pilot pressure required to bias the valve means 21 to a first position as shown. Pilot pressure is directed to the valve means 21 along pilot lines 23.

In a highly preferred embodiment, the valve means 21 is embodied as a first valve 21a and a second valve 21b, both of which may be configured as spring biased, pilot operated 3-way valves. The first valve 21a and the second valve 21b may be separate devices but it is preferred that they be constructed as a single hydraulic integrated circuit (HIC) incorporating both valves 21a, 21b. The use of the HIC construction provides certain mounting and plumbing economies.

During normal steering, the first valve 21a and the second valve 21b are maintained in the first position, as shown, by the pilot pressure applied to the valves 21a, 21b along the lines 23. Hydraulic fluid under pressure is directed along either the first conductor 25 or the second conductor 27 to cause movement of the actuator means 29 and consequent steering of the vehicle. In the event that the steering wheel 13 is actuated to deliver fluid under pressure along the first conductor 25, the second conductor 27 acts as a return path to the power steering unit 11 for fluid exhausted from the actuator means 29.

The actuator means 29 is preferably embodied as either one double ended hydraulic cylinder (not shown) or two single ended hydraulic cylinders 29a, 29b. Two cylinders are preferred for larger vehicles while a single cylinder may be beneficially employed in smaller vehicles. If one double ended cylinder is employed, in the position of cylinder 29a, for example, the conductor segments 31 and 33 may be omitted and the conductor segments 35 and 37 connected to each end of the cylinder, respectively.

It is to be appreciated that the pilot pressure lines 23 are illustrated as two separate lines only for ease of explanation. In a preferred embodiment, a single line would be used and would incorporate a connection to both valves 21a, 21b at a location physically adjacent the valves 21a, 21b. This will help avoid the possibility of loss of pilot pressure in one of the valves 21a, 21b but not in the other, an event which could render the system 10 non-functional for either normal or auxiliary steering.

Pilot pressure may be lost at the lines 23 upon failure of the vehicle engine, the normal steering pump or the pilot lines 23, for example. Upon loss of pilot pressure for any reason, the valves 21a, 21b will be urged by compression springs 39 to a second position for diverting fluid from the steering unit 11 to a pressure intensification device 43.

Referring further to FIG. 1, a preferred pressure intensification device 43 will include a low pressure section 45 and a high pressure section 47. The low pressure section 45 is preferably embodied as a rotary gear motor having a first displacement per revolution. The low pressure section 45 will be coupled by mechanical drive means 49 to the high pressure section 47. When powered by hydraulic fluid from the steering unit 11, the low pressure section 45 functions as the driving motor for the high pressure section 47.

In a preferred embodiment, the high pressure section 47 will be configured as a rotary gear pump having a second displacement per revolution. Both the low pressure section 45 and the high pressure section 47 should be designed to have relatively small leakage rates (and therefore, relatively high volumetric efficiency). This is so since otherwise, the hydraulic horsepower intended to be transferred from the power steering unit 11 to the actuator means 29 will otherwise be lost in leakage or "slippage". If needed to prevent cavitation, fluid makeup lines can be installed in a known manner.

In a highly preferred embodiment, the first displacement of the low pressure section 45 will be greater than the displacement of the high pressure section 47, preferably a multiple thereof. The displacement of the low pressure section 45 and its magnitude relative to that of the high pressure section 47 may be selected in view of certain system parameters. Those parameters include the displacement of the power steering unit 11 when manually operated as a pump and the displacement per unit length of travel of the steering cylinders 29a, 29b.

Other system parameters to be considered include the nominal horsepower which may readily generated by the operator while rotating the steering wheel 13 during auxiliary steering and the time over which the operator may reasonably be expected to provide such horsepower. Yet another parameter to be considered is the hydraulic pressure required to cause movement of the steering cylinders 29a, 29b under a very adverse condition, e.g., the vehicle is motionless and fully loaded. In any event, the steering effort required during auxiliary steering will be noticeably greater than that required during normal steering.

In normal operation, it is first assumed that fluid is available from the normal steering hydraulic pump at the line 19 and that pilot pressure is available in the lines 23 to urge the valves 21a, 21b to a first position as shown. It is also assumed that counter clockwise rotation of the steering wheel 13 will cause this hydraulic fluid to be delivered from the port 15 along the first conductor 25 to the rod end 51 of the steering cylinder 29a and to the head end 53 of the steering cylinder 29b. The pistons 55 of both cylinders 29a, 29b will move to the right as viewed in FIG. 1. It is assumed that the steering linkage (not shown) is coupled to the vehicle wheels (not shown) in such a way that rightward movement of the pistons 55 will cause the vehicle to steer to the left.

As the pistons 55 of the cylinders 29a, 29b move to the right, fluid is exhausted from the ports 57 and returns along the second conductor 27 to the port 17 of the power steering unit 11. Similarly, clockwise rotation of the steering wheel 13 directs fluid along the second conductor 27 and steering to the right is accomplished.

To illustrate the operation of the auxiliary steering system, it is assumed that for some reason, pilot pressure in lines 23 is substantially lost. The valves 21a, 21b will then be urged by their springs 39 to the second position. The first conductor 25 and the second conductor 27 will be blocked at the ports 59 and the power steering unit 11 will be connected in a closed loop along lines 61 to the low pressure section 45 of the intensification device 43. The valves 21a, 21b are therefore seen to selectively provide motive power to the device 43.

Rotation of the steering wheel 13 in a counter clockwise direction will cause fluid at a first pressure to be delivered from port 15 to the port 63 of the low pressure section 45. The low pressure section 45 will thereupon provide rotary, driving power to the high pressure section 47. When doing so, it will exhaust fluid from the port 65 to be returned back to the port 17 of the power steering unit 11.

As the high pressure section 47 is driven by the low pressure section 45, the high pressure section 47 will deliver fluid at a second pressure from the port 67 to the cylinders 29a, 29b and the vehicle will steer to the left. Similarly, rotation of the steering wheel in a clockwise direction will result in vehicle steering to the right.

It is to be appreciated that the ratio of the second pressure to the first pressure will be generally equal to the ratio of the first displacement to the second displacement. Disregarding certain hydraulic losses, the low pressure section 45 and the high pressure section 47 may be viewed as having generally equivalent hydraulic horsepowers.

It is also to be appreciated that steering by the auxiliary power steering system 10 using operator actuation may be performed indefinitely, subject only to the stamina of the operator. Using the inventive system 10, an auxiliary steering capability will be available irrespective of the condition of almost any vehicle component—engine, pump, battery or the like—and irrespective of whether the vehicle is motionless.

The intensification device 43 and the valve means 21 will be relatively small in size and connectable to other components such as the steering unit 11 and the actuator means 29 by flexible hydraulic hoses. Therefore, the auxiliary system 10 lends itself to being made up in kit form for field installation using hoses and fittings supplied by others or included in the kit. This is especially advantageous for owners or manufacturers of vehicles which were not originally equipped with the inventive system 10 but which are nevertheless required to conform to certain auxiliary power steering requirements.

While the principles of this invention have been described in connection with specific embodiments, it should be understood clearly that these descriptions are made only by way of example and are not intended to limit the scope of the invention.

What is claimed is:

1. An auxiliary system for steering a vehicle including:
   a power steering unit coupled to a vehicle steering wheel, said steering unit thereby made capable of being manually powered by a vehicle operator for providing a supply of fluid at a first pressure;
   valve means connected between said steering unit and a pressure intensification device for selectively providing motive power to said device;
   actuator means connected between said device and wheels of a vehicle for steering movement thereof;
   said intensification device being powered for rotation by said fluid at said first pressure when said steering unit is manually powered, said device thereby delivering hydraulic fluid to said actuator means at a second pressure for steering said vehicle.

2. The system of claim 1 wherein said valve means provides said motive power to said intensification device in the event of substantial loss of a pilot pressure applied to said valve means.

3. The system of claim 2 wherein said valve means includes a first hydraulic valve for directing fluid at said first pressure to said intensification device and a second hydraulic valve for receiving fluid exhausted from said device and returning said fluid to said steering unit.

4. The system of claim 3 wherein said hydraulic valves are 3-way valves maintained in a first position when said pilot pressure is applied thereto and spring biased to a second position in the substantial absence of said pilot pressure.

5. The system of claim 4 wherein said actuator means is embodied as a double ended hydraulic cylinder for steering movement of said vehicle wheels.

6. An auxiliary power steering system including:
actuator means for steering a wheeled vehicle;
a hydraulic pressure intensification device coupled in a fluid transfer relationship to said actuator means for controlling a position thereof;
valve means coupled to said actuator means and to said intensification device and movable between a first, normal position for directing pressurized fluid to said actuator means and a second, auxiliary position for directing pressurized fluid to said intensification device;
a power steering unit coupled to said valve means and positionable by a vehicle operator for directing pressurized fluid from a hydraulic pump to said actuator means when said valve means is in said first position;
said power steering unit being manually powered by said vehicle operator for delivering pressurized fluid to said intensification device and thereby rotating said intensification device; when said hydraulic pump is inoperable and said valve means is in said second position.

7. The system of claim 6 wherein said intensification device includes a high pressure section for delivering pressurized fluid to said actuator means and a low pressure section for powering said high pressure section when said power steering unit is being manually actuated by said vehicle operator.

8. The system of claim 7 wherein said intensification device is of the rotary type having said low pressure section mechanically coupled to said high pressure section in a driving relationship.

9. The system of claim 6 wherein said valve means is maintained in said first position by a pilot pressure when said hydraulic pump is operable and is biased to said second position upon the substantial loss of said pilot pressure.

10. An auxiliary system for steering a vehicle including:
a power steering unit for providing pressurized fluid to an actuator means for steering a vehicle in normal operation, said steering unit being coupled to a vehicle steering wheel and thereby made capable of being manually powered by a vehicle operator for providing a supply of fluid at a first pressure in auxiliary operation;
valve means connected between said steering unit and a the low pressure section of a pressure intensification device for selectively directing said supply of fluid to said low pressure section, thereby providing motive power to said device;
actuator means connected between a high pressure section of said device and wheels of a vehicle for steering movement thereof;
said intensification device being powered for rotation by said fluid at said first pressure when said steering unit is manually powered, said device thereby delivering hydraulic fluid to said actuator means at a second pressure for steering said vehicle.

11. The system of claim 10 wherein said power steering unit normally receives hydraulic fluid from an engine-driven pump, said fluid providing a pilot pressure for maintaining said valve means in a first position in normal operation;
said valve means being spring biased to a second position on the substantial loss of said pilot pressure, said valve means thereby enabling said vehicle operator to manually operate said steering unit and thereby power said intensification device for steering movement of said actuator means.

12. A kit for incorporating an auxiliary power steering system into a vehicle equipped with actuator means for steering movement of vehicle wheels and a primary power steering unit coupled to the vehicle steering wheel, the kit including:
a pressure intensification device having a low pressure section for receiving hydraulic fluid from said steering unit during an auxiliary steering condition and a high pressure section for delivering hydraulic fluid to said actuator means to effect vehicle steering;
valve means connectable to said steering unit, said actuator means and said device for selectively directing said hydraulic fluid to said low pressure section, thereby providing motive power for rotating said intensification device thereto;
said hydraulic fluid being provided by manual powering of said steering wheel during an auxiliary steering condition;
said valve means directing said hydraulic fluid to said low pressure section upon the substantial loss of a pilot pressure.

13. The kit of claim 12 further including hydraulic hoses, fittings and other hardware for installing said valve means and said pressure intensifying device upon said vehicle.

14. The kit of claim 12 wherein said valve means includes a first valve and a second valve, said valves being constructed and arranged to be maintained in a first, normal position when said pilot pressure is applied to said valves and to be spring biased to a second, auxiliary position upon a substantial loss of said pilot pressure.

* * * * *